United States Patent

[11] 3,619,371

[72] Inventors Eric Mitchell Crook;
Garth Kay, both of London, England
[21] Appl. No. 742,978
[22] Filed June 26, 1968
[45] Patented Nov. 9, 1971
[73] Assignee National Research Development Corporation
London, England
[32] Priorities July 3, 1967
[33] Great Britain
[31] 30615/67;
Feb. 12, 1968, Great Britain, No. 6870/68

[54] PRODUCTION OF A POLYMERIC MATRIX HAVING A BIOLOGICALLY ACTIVE SUBSTANCE BOUND THERETO
20 Claims, No Drawings
[52] U.S. Cl.................................................. 195/63 R,
424/85, 424/88, 195/63 P, 195/DIG. 11, 195/68,
260/209 D, 260/233.3 R, 260/112 R, 260/123.7,
260/91.3 R, 260/213
[51] Int. Cl....................................................... C07g 7/02,
A61k 23/00

[50] Field of Search............................................. 195/63, 68;
260/233.3

[56] References Cited
UNITED STATES PATENTS
3,403,146 9/1968 Hunt ............................ 260/233.3
OTHER REFERENCES
Weilky et al. Immunochemistry, 1965, Vol. 2 pp. 293- 322

Primary Examiner—Lionel M. Shapiro
Attorney—Finnegan, Henderson & Farabow

ABSTRACT: A polymeric matrix having a biologically active substance chemically bound thereto, which comprises a polymer and a biologically active substance linked by groups of the formula:

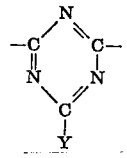

where Y represents a nucleophilic substituent that is an amino group, or an aliphatic or aromatic group.

PRODUCTION OF A POLYMERIC MATRIX HAVING A BIOLOGICALLY ACTIVE SUBSTANCE BOUND THERETO

This invention relates to the production of polymeric matrices having biologically active substances chemically bound thereto.

The utility of enzymes as catalysts and other biologically active substances such as antigens, antibodies, etc. for example, in purifications, may be increased by attaching them to solid supports so that, for example, they may be removed from the reaction mixture or used in processes in which the reactants flow continuously over them. Also, the stability of an enzyme attached to a solid support is often greater than that of the free enzyme.

It is desirable that the enzymes should be bound by chemical rather than by physical means as physically bound enzymes may not remain attached under all reaction conditions. However, since biologically active molecules are usually fairly unstable, it is desirable that they should not be subjected to severe reaction conditions. It is the object of the present invention to provide a process whereby a biologically active substance may be bound to a polymeric matrix without subjecting the substance to severe reaction conditions.

According to the present invention, there is provided a polymeric matrix having a biologically active substance chemically bound thereto, which comprises a polymer and a biologically active substance linked by groups of the formula:

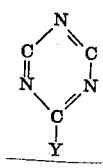

where Y represents a nucleophilic substituent that is an amino group, or an aliphatic or aromatic group.

Further according to the present invention, a process for producing a polymeric matrix having a biologically active substance chemically bound thereto comprises reacting the substance with a polymer having attached thereto groups of formula:

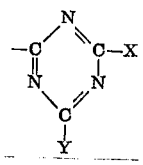

where X represents a radical capable of reacting with the biologically active substance, e.g. a halogen atom, and Y represents a nucleophilic substituent that is an amino group, or an aliphatic or aromatic group.

The group Y is preferably one that carries a positive charge when in contact with solutions having a pH in the normal biological range, that is to say, the range within which biological reactions will proceed, which is usually between about pH2 and 10, particularly between 5 and 9, such as, for example, about pH7. Groups that are electrically neutral or that carry a negative charge can be used in some circumstances, but it has been found that the presence of such a positive charge frequently assists the reaction of a biologically active substance with the polymer.

Where Y is a nucleophilic aliphatic or aromatic substituent group, this is preferably one which contains nitrogen, oxygen or sulfur and particularly a nitrogen-containing group such as, for example, a substituted amino group.

As examples of preferred nucleophilic groups there may be mentioned amino, alkyl or aryl substituted amino, alkylamino, arylamino, oxyalkyl, oxyaryl, thioalkyl, and thioaryl groups, and residues of dyestuffs, particularly those containing amino groups such as, for example, nitro-dyestuffs, azo-dystuffs, including thiazole dystuffs, acridine-, oxyazine-, thiazine- and azine dyestuffs, indigoids, aminoanthraquinones, aromatic diamines, aminophenols, aminonaphthols and N and O-acidyl or alkyl, aralkyl or aryl derivatives of these, nitramines, thiophenols, or amino mercaptans.

Particular examples of suitable nucleophilic groups include —O·CH₂·COOH, —NH·CH₂·COOH, —S·CH₂COOH, —NH·C₂H₄·SO₃H, —OC₄H₈·N̈(C₂H₅)₃, —NH·C₆H₄·SO₃H, —O·C₆H₄·COOH, —S·C₆H₄·COOH, —NH·C₂H₄·OH and —O·C₂H₄·OH. Excellent results have been obtained using —NHC₃H₆·NH (C₂H₄OH)₂ as the nucleophilic group.

Where X is a halogen atom this is preferably a chlorine or fluorine atom.

The reaction between the polymer and the biologically active substance occurs by the replacement of the halogen atom represented by X by the residue of the biologically active substance. The reaction may be carried out by bringing the polymer and the biologically active substance into contact in an aqueous medium, for example, by adding the polymer to an aqueous solution of the biologically active substance. Since biologically active substances unstable, the temperature should preferably below, for example, room temperature and the pH as near to neutral as possible. However, it may be necessary to use a slightly alkaline pH, for example, between pH7 and pH8.6, as the reaction occurs more rapidly at alkaline pH. At neutral pH it may not be sufficiently rapid for practical purposes.

Polymers having groups of the given formula wherein Y represents a halogen atom can be prepared, for example, by the method described in British Pat. Specification No. 20616 / 67. These can be converted into polymers suitable for use in the present invention by the use of a suitable reagent to replace one of the halogen atoms with a specified nucleophilic group. Specific examples of suitable reagents include:

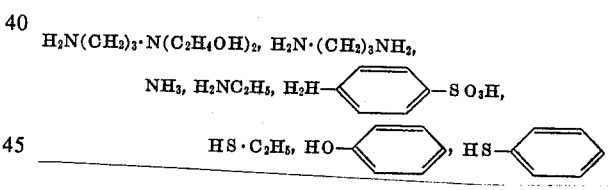

This is a very convenient process for making polymers for use in the present invention since the reagent also removes any traces of free cyanuric chloride which may be present in the polymer due to its method of preparation.

An alternative process for making polymers for use in the present invention comprises reacting an s-triazinyl compound of formula:

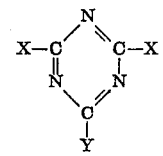

where X and Y have the meaning given above, with a polymer having nucleophilic groups, and stopping the reaction before substantial cross-linking has occurred.

Suitable polymers are often hydrophilic polymers, for example, those having free hydroxyl groups, and there can be used naturally occurring polymers such as celluloses, cross-linked dextrans sold under the trademark "SEPHADEX" by Pharmacia of Uppsala, Sweden Starch, dextran, and proteins such as wool, and synthetic polymers such as polyvinyl alcohol. The reaction of the polymer with the s-triazinyl compound can be carried out in aqueous solution provided that Y contains a solubilising substituent, and the reaction can then be conveniently stopped by reducing the pH, for example, by washing with water. Suitable solubilising substituents include, for example, carboxy groups, sulfonic acid groups, or $-N(alkyl)_3$ groups. If the s-triazinyl compound of the formula given above is not water-soluble, a mixed organic/ aqueous solvent should be used. The compound of the above formula is not water-soluble when Y represents, for example, methoxy, ethylamino, butylthio or phenoxy.

Where Y contains an alkyl residue this is preferably a short chain residue since the cyanuric derivative of such a residue is more soluble than that of a long-chain residue. If long-chain residues such as $C_6$ are used it may be necessary to use a mixed organic/aqueous solvent even though the residue is substituted with a solubilising group.

The reaction of the polymer with the s-triazinyl compound, the reaction of the s-triazinyl substituted polymer with the biologically active substance and the reaction of the polymer-bound biologically active substance in use may be controlled by selecting Y so that the reactants in the various reactions are appropriately charged.

When the reaction with the biologically, active substance has been completed, preferably unreacted halogen atoms are deactivated for example, by reaction with ammonia or an aliphatic amine.

A wide range of biologically active substances can be bound to the polymers of the present invention including enzymes present in or isolated from animal, plant or microbiological tissue such as, for example, proteolytic enzymes such as trypsin, chymotrypsin, and papain; hydrolases such as $\beta$-galactosidase, ribonuclease, alkaline phosphotase, amylo glucosidase and dextranase; dehydrogenases such as lactic dehydrogenase; kinases such as creatine phosphokinase, and pyruvate kinase; oxidases such as glucose oxidase; and amidases such as amidase and penicillin amidase; antigens and antibodies.

The polymeric matrices of the invention having biologically active substances bound thereto can be used in a wide variety of enzymically catalysed reactions, and are often suitable for use in processes in which soluble enzymes have previously been used. Thus they may, for example, be used in the preparation of penicillins, beer clarification, the preparation of glucose using amyloglucosidase, the preparation of optically active amino acids, and the formation of l-alanine by transamination. Other potential uses include enzymatic hydrolysis of carbohydrates, the processing of waste materials, the specific manipulation of large natural molecules such as steroids, alkaloids, chloramphenicol and riboflavine, alcoholic and other kinds of fermentation, the fixing of nitrogen, a luciferase system for A.T.P. estimation, biochemical fuel-cells, and the specific oxidation and reduction of organic materials, including carbon dioxide fixation.

The polymeric matrices having biologically active substances bound thereto may also be used in enzymatic analysis, particularly in the sequential analysis of proteins, R.N.A. and D.N.A. In this case the substrate can be, for example, force through a permeable sheet containing the enzyme by means of a syringe. Where chromatography follows the reaction, it may be possible to chromatograph the substrate across a permeable sheet containing the enzyme, for example in urea analysis.

The following examples illustrate the invention:

EXAMPLE 1

(a). Preparation of carboxymethylamino-chloro-s-triazinyl-cellulose. 7.2 g. of sodium bicarbonate was dissolved in a mixture of 60 ml. normal glycine solution, 50 ml. distilled water and 50 ml. acetone. This solution was added to a solution of 3.4 g. cyanuric chloride in 100 ml. acetone. The mixture was vigorously stirred and much carbon dioxide was evolved. After 1 minute the pH was reduced to 2.5 by addition of dilute hydrochloric acid, the carbon dioxide evolved being blown off by a stream of nitrogen. The acetone was then removed by evaporation under reduced pressure at a temperature not greater than 40° C. The crystals which precipitated, were filtered off, washed with a little distilled water and dried in a vacuum desiccator over silica gel for 2 hours.

The product was recrystallized by dissolving in a 50 percent (v/v) water-acetone mixture, and removing the acetone at low temperature.

The 2,4-dichloro- 6-carboxymethylamino-s-triazine was added to 5 ml. distilled water, and the pH of the mixture raised to 6 by addition of 4N sodium hydroxide solution At this pH the s-triazine compound dissolved completely. The total volume of solution was then made up to 10 ml. by addition of distilled water and 2 g. of cellulose powder was added. The pH was raised to 11 and maintained at that (±0.2 of pH unit) by the dropwise addition of 4N sodium hydroxide. A sample was taken 10 minutes after the pH had been adjusted to 11. The reaction was carried out in a water bath at 25° C. However, because the reaction was exothermic the temperature of the reaction mixture rose to a maximum of 30° C., at 3 minutes after which it fell again to 26° C., at 10 minutes. The sample was pipetted into 20 ml. dilute acetic acid (20 percent v/v), filtered, washed with de-ionized water until the filtrate was chloride free, as measured with silver nitrate, and then stirred overnight in 10 ml. deionized water, and dried in a vacuum desiccator over silica gel.

(b) Preparation of carboxymethoxy-chloro-s-triazinyl-cellulose. cellulose. 5g. glycollic acid and 5 g. sodium bicarbonate were stirred into 10 ml. distilled water until they both completely dissolved. This solution was added to a solution of 5 g. cyanuric chloride in 20 ml. acetone. The mixture was stirred and the temperature maintained at less than 30° C., by addition of small amounts of crushed ice. After 20 minutes this mixture, which now had become a clear solution, was put on to the rotary evaporator, and the excess acetone was removed under reduced pressure at less than 30° C. The 2,4-dichloro- 6-carboxymethoxy-s-triazine was precipitated out as a thick oil. The aqueous phase was poured off the oil, and the oil was washed with about 5 ml. of distilled water. The 2,4-dichloro- 6-carboxymethoxy-s-triazine was redissolved by adding 10 ml. distilled water containing excess (2.4 g.) sodium bicarbonate. The final volume, plus washings, was 15 ml. 3 g. of cellulose powder was then added, and the mixture stirred at 25° C., in a water bath. The pH of the solution was raised to 9 and maintained at that by the addition of 4 N sodium hydroxide solution. The buffering effect of the carbonate ions allowed this to be done without difficulty. Samples were taken 6 and 15 minutes after the start of the reaction. The samples were pipetted in 20 ml., dilute acetic acid (20 percent v/v), filtered, washed with deionized water until the filtrate was chloride free, as measured with silver nitrate, and then stirred overnight in 10 ml. deionized water. Finally the cellulose was again filtered off, washed with a further 10 ml. deionized water, and dried in a vacuum desiccator over silica gel.

Reaction of Triazinyl Cellulose Derivatives with Chymotrypsin

The amount of enzyme attached to a cellulose sample was estimated as the difference between the amount of enzyme protein added initially and the amount removed by subsequent washing as estimated by the method described by Lowry, O. W. Rosebrough, N. J. Farr, A. L. and Randell, R. J. J. Biol. Chem. 193, 265 (1951).

The washing was carried out by placing the solution containing the cellulose and chymotrypsin on a Buchner funnel, and removing the excess liquid by gentle suction. The residue was washed with a solution which was 1N in sodium chloride and 2M in urea. The filtrate was collected and the concentration of enzyme was estimated by the Lowry et al. method, a 2M urea 1N sodium chloride solution being used as a blank. About 95 percent of the adsorbed enzyme is removed by this method.

The enzyme activity was measured semiquantitatively as follows:

The reaction was carried out in 5 ml. of a solution 0.50 N in sodium chloride and 0.00112 M in sodium phosphate. The pH of the solution was 8.00±0.02. The enzyme-cellulose, or 0.1 ml. of the free enzyme solution, was added to this solution, and after readjustment of the pH, 0.25 ml. of N-acetyl-L-tyrosinic ethyl ester monohydrate (ATEE) solution was added.

The ATEE solution contained 0.0574 g. ATEE dissolve in 4 ml. spectrosol dioxane and made up to 25 ml. total volume with deionized water. Thus the final assay solution contained $2.02 \times 10^{10h6}$ moles of ATEE, and is therefore $$\frac{2.02 \times 10^{-6}}{5.35 \times 10^{-3}} = 6.02 \times 10^{-3} M.$$

It contained 0.75 percent (v/v) organic solvent.

The reaction was followed titrimetrically in the usual way, using 0.01N sodium hydroxide as titrant.

In the following results, percent activity means 100 × activity of a given weight of attached enzyme/activity of the same weight of unattached enzyme.

The reactions of (a) carboxymethylamino-chloro-s-triazinyl cellulose and (b) carboxymethoxy-chloro-s-triazinyl cellulose with chymotrypsin.

The experiments were carried out as follows:

A small weight of the cellulose sample was stirred for 5 minutes in 0.01 N hydrochloric acid, filtered and washed until chloride free. It was then put in 1 ml. enzyme solution. 1ml. phosphate buffer solution was then added. The mixture was then stirred overnight either in the cold room, when the sample temperature was 2° C.±0.5° C., or in a water bath at 25° C., The excess enzyme was then washed off, and the degree of substitution and amount of activity remaining estimated in the usual way.

RESULTS

| -s-triazinyl cellulose used | (b) [1] | (a) | (b) [2] |
| --- | --- | --- | --- |
| Weight of sample, g | 0.2907 | 0.2746 | 0.2015 |
| Weight of enzyme, g | 0.0082 | 0.0082 | 0.0082 |
| Strength of buffer | [3] | [4] | [4] |
| Temp., ° C | 2 | 25 | 25 |
| pH | 8.6 | 8.6 | 8.6 |
| Percent substitution | 0.765 | 0.46 | 1.15 |
| Percent activity | 46 | 19 | 17 |

[1] 6-minute sample.
[2] 15-minute sample.
[3] N/5 phosphate.
[4] N phosphate.

EXAMPLE 2

Twelve discs of No. 1 paper (2.5 cm. diameter) were soaked in N/1 NaOH for 5 minutes. Excess NaOH was dampened off and the papers stirred in dioxane (20–30 ml.) for 5 minutes and then removed. The papers were then added to 20 ml. of a solution of cyanuric chloride (0.25 g./ml.) at room temperature, followed immediately by 25 ml. water and then after about 5 seconds by 20–30 ml., glacial acetic acid. The papers were then removed and resuspended in 20 ml. dioxane. After 2 minutes 20 ml. water and a little glacial acetic were added. After a further 5 minutes the papers were removed and washed thoroughly on a Buchner funnel with water and then with acetone. Finally they were dried in a vacuum desiccator and stored at 2° C.

A solution of N-(3-aminopropyl)-diethanol-amine (3 g./100 ml.) was brought to pH7 with HCl 10 ml. water was added to 10 ml. of this amine solution and the papers suspended in it for 7½ minutes at room temperature. 10 ml. of N/1 HCl was then added to stop the reaction and the papers were then washed with 5M NaCl followed by water and finally acetone. They were then replaced in the desiccator.

Attachment β-Galactosidase

The enzyme (0.1 ml.) plus EDTA (0.001M) 0.025 ml. plus MgSO₄ (0.1M) 0.025 ml. was added to the dried paper (one disc) and left for one-half hour. After washing it was found that three such discs gave a good optical density change 0.5 at 420 mμ when reacted on ortho nitro phenyl galactoside at 4 ml./min. The excess active chlorine and any second chlorine were removed by leaving the discs in the N-(3-aminopropyl)-diethanolamine solution with small amounts of EDTA and MgSO₄ solutions.

Attachment of Pyruvate Kinase

Pyruvate kinase (0.25 ml. of 5.5 mg./ml. preparation in (NH₄)₂SOB4 was dialysed overnight at 4° C., against 2 litres of buffer containing 3 mM K phosphate pH7.4, 0.03 mM EDTA and 0.375 mM MgSO₄. The dialysate (0.4 ml.) was diluted with 1 ml. of a solution of potassium phosphate. 100 mM pH7.4 and 0.1 ml. of this mixture was then pipetted on to each of six discs. The discs were covered and left for 50 minutes at about 25° C. They were then suspended in 15–20 ml. of the amine solution containing:

30 mM N-(3-aminopropyl)-diethanolamine
2.1 mM EDTA         pH7.8
11 mM MgSO₄
42 mM potassium phosphate After 1 day at room temperature, the discs were stored in a refrigerator. One such disc gave a fair degree of reaction when substrate was passed through at 4 ml./minute.

We claim:

1. A polymeric matrix having a biologically active substance chemically bound thereto, which comprises a polymer and a biologically active substance selected from the group consisting of enzymes present in or isolated from animal, plant or microbiological tissue, antigens and antibodies, the polymer and said substance being linked by groups of the formula:

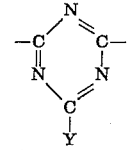

where Y represents a nucleophilic substituent that is an amino group, or an aliphatic or aromatic group.

2. A polymeric matrix according to claim 1 in which the group Y is one that carries a positive charge when in contact with solutions having a pH in the normal biological range.

3. A polymeric matrix according to claim 2 in which the group Y is one that carries a positive charge when in contact with solutions having a pH between 5 and 9.

4. A polymeric matrix according to claim 1 in which the group Y is one that contains nitrogen, oxygen or sulfur.

5. A polymeric matrix according to claim 1, in which the group Y is an amino, alkyl or aryl substituted amino, alkylamino, arylamino, oxyalkyl, oxyalkyl, oxyaryl, thioalkyl or thioaryl group, or a residue of a dyestuff.

6. A polymeric matrix according to claim 1 in which the group Y is —O·CH₂COOH, —NH·CH₂COOH, —S·CH₂COOH, —NH·C₂H₄·SO₃H, —OC₄H₈N (C₂H₅)3, —NH·C₆H₄SO₃H, —O·C₆H₄COOH, —S·C₆H₄COOH, —NH·C₂H₄·OH, or —O·C₂H₄·OH.

7. A polymeric matrix according to claim 1, in which the group Y is —NC₃H₆NH (C₂H₄OH)₂.

8. A polymeric matrix according to claim 1, in which the polymer is one that has free hydroxyl groups.

9. A polymer matrix according to claim 8, in which the polymer is a cellulose, cross-linked dextron, starch, dextran, a protein or polyvinyl alcohol.

10. A polymeric matrix according to claim 1, in which the biologically active substance is a proteolytic enzyme, a hydrolase, a dehydrogenase, a kinase, an oxidase, or an amidase.

11. A polymeric matrix according to claim 1, in which the biologically active substance is chymotrypsin.

12. A polymeric matrix according to claim 1, in which the biologically active substance is lactic dehydrogenase, β-galactosidase, creatine phospho-kinase, pyruvate kinase, an antigen, or an antibody.

13. A polymeric matrix according to claim 1, in which the biologically active substance is trypsin, papain, ribonuclease, alkaline phosphotase, amylo glucosidase, dextranase, glucose oxidase, amidase, or penicillin amidase.

14. A process of producing a polymeric matrix having a biologically active substance selected from the group consisting of enzymes present in or isolated from animal, plant or microbiological tissue, antigens and antibodies, chemically bound thereto, which comprises reacting the substance with a polymer having attached thereto groups of the formula:

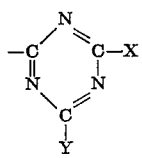

where X represents a radical capable of reacting with the biologically active substance and Y represents a nycleophilic substituent that is an amino group, or an aliphatic or aromatic group.

15. A process according to claim 14, in which X represents a halogen atom.

16. A process according to claim 15, in which the halogen is chlorine or fluorine.

17. A process according to claim 14, that is carried out in an aqueous medium.

18. A process according to claim 17, that is carried out at a slightly alkaline pH.

19. A process according to claim 14, in which any radicals X remaining after reaction with the biologically active substance are deactivated.

20. A process according to claim 19, in which the radicals X are deactivated by reaction with ammonia or an aliphatic amine

* * * * *